(12) United States Patent
Lee et al.

(10) Patent No.: US 8,205,458 B2
(45) Date of Patent: Jun. 26, 2012

(54) DUPLEX TURBINE NOZZLE

(75) Inventors: Ching-Pang Lee, Cincinnati, OH (US); Robert Joseph Orlando, West Chester, OH (US)

(73) Assignee: General Electric Company, Schenectady, NY (US)

( * ) Notice: Subject to any disclaimer, the term of this patent is extended or adjusted under 35 U.S.C. 154(b) by 948 days.

(21) Appl. No.: 11/967,479

(22) Filed: Dec. 31, 2007

(65) Prior Publication Data

US 2010/0047056 A1 Feb. 25, 2010

(51) Int. Cl.
*F01D 5/18* (2006.01)

(52) U.S. Cl. .......................................... 60/806; 415/115

(58) Field of Classification Search .................... 60/806, 60/752, 754, 746, 740; 415/115–117, 173.1, 415/176, 178; 416/96 R, 97 R
See application file for complete search history.

(56) References Cited

U.S. PATENT DOCUMENTS

| | | | |
|---|---|---|---|
| 3,475,107 A | 10/1969 | Auxier | |
| 4,616,976 A | 10/1986 | Lings et al. | |
| 5,090,866 A * | 2/1992 | Blair | 415/115 |
| 5,169,288 A | 12/1992 | Gliebe et al. | |
| 5,997,245 A | 12/1999 | Tomita et al. | |
| 6,077,036 A | 6/2000 | Heffron et al. | |
| 6,183,192 B1 | 2/2001 | Tressler et al. | |
| 6,270,317 B1 | 8/2001 | Manning et al. | |
| 6,345,955 B1 | 2/2002 | Heffron et al. | |
| 6,354,797 B1 | 3/2002 | Heyward et al. | |
| 6,402,458 B1 | 6/2002 | Turner | |
| 6,554,562 B2 | 4/2003 | Dudebout et al. | |
| 6,609,880 B2 | 8/2003 | Powis et al. | |
| 6,783,323 B2 | 8/2004 | Shiozaki et al. | |
| 7,008,178 B2 | 3/2006 | Busch et al. | |
| 7,147,432 B2 * | 12/2006 | Lowe et al. | 415/116 |
| 2007/0140849 A1 | 6/2007 | Flodman et al. | |

OTHER PUBLICATIONS

U.S. Appl. No. 11/765,522, filed Jun. 20, 2007, Lee et al.
U.S. Appl. No. 11/957,653, filed Dec. 17, 2007, Lee et al.
U.S. Appl. No. 11/957,539, filed Dec. 17, 2007, Broomer et al.

* cited by examiner

*Primary Examiner* — Ehud Gartenberg
*Assistant Examiner* — Vikansha Dwivedi
(74) *Attorney, Agent, or Firm* — David J. Clement; Trego, Hines & Landenheim, PLLC

(57) ABSTRACT

A duplex turbine nozzle includes a row of different first and second vanes alternating circumferentially between radially outer and inner bands in vane doublets having axial splitlines therebetween. The vanes have opposite pressure and suction sides spaced apart in each doublet to define an inboard flow passage therebetween, and corresponding outboard flow passages between doublets. The vanes have different patterns of film cooling holes with larger cooling flow density along the outboard passages than along the inboard passages.

24 Claims, 6 Drawing Sheets

DUPLEX TURBINE NOZZLE

BACKGROUND OF THE INVENTION

The present invention relates generally to gas turbine engines, and, more specifically, to turbines therein.

In a gas turbine engine, air is pressurized in a compressor and mixed with fuel in a combustor for generating hot combustion gases. Energy is extracted from the gases in a high pressure turbine (HPT) which powers the compressor.

And, additional energy is extracted in a low pressure turbine (LPT) which drives an upstream fan in an aircraft turbofan aircraft engine application, or drives an external drive shaft in marine and industrial applications.

The modern combustor is annular and includes radially outer and inner combustion liners extending downstream from a forward dome to define an annular combustion zone. A row of fuel injectors and cooperating air swirl cups are mounted in the dome for discharging air atomized fuel jets that are suitably ignited for generating the combustion gases.

The fuel injectors are spaced circumferentially apart from each other typically in a uniform distribution, and correspondingly effect relatively hot streaks of combustion gases which flow downstream to the annular combustor outlet.

The maximum combustion gas temperature is found along the center of each hot streak, and the combustion gas temperature correspondingly decreases radially outwardly from the centerline of each hot streak, which is both radially between the outer and inner combustor liners, as well as circumferentially around the combustor between the circumferentially spaced apart hot streaks.

The resulting temperature pattern of the combustion gases at the annular combustor outlet varies both radially between the outer and inner liners, and circumferentially between the hot streaks, with the lower temperature gases between the hot streaks typically being referred to as cold streaks. The differential temperature between the hot and cold streaks may be several hundreds of degrees and affects performance and operation of the downstream turbine components.

More specifically, the combustion gases discharged from the combustor outlet are first received by the first stage HPT turbine nozzle which guides the gases to the following first stage row of turbine rotor blades mounted on the perimeter of a supporting rotor disk. The turbine nozzle includes a row of hollow nozzle vanes mounted radially between corresponding outer and inner bands.

The nozzle is typically segmented circumferentially in a common configuration of nozzle doublets having two vanes integrally mounted in corresponding outer and inner band segments.

The annular nozzle is therefore circumferentially divided by axial splitlines at corresponding endfaces of the outer and inner bands of the nozzle doublets. And, the endfaces typically include slots for mounting spline seals therein for maintaining the circumferential continuity of the turbine nozzle and sealing internal cooling air loss therefrom.

The number of nozzle vanes in the complete row is substantially greater than the number of fuel injectors in the combustor and is commonly not an integer multiple thereof. Accordingly, in the assembly of the combustor relative to the turbine nozzle, the fuel injectors vary in relative circumferential position with the leading edges of the row of nozzle vanes.

The hot streaks generated from the fuel injectors during operation are therefore circumferentially aligned or clocked differently or randomly from vane to vane, and therefore subject the vanes to different heat loads during operation. The hot streaks bathe the nozzle vanes in maximum temperature combustion gases, whereas the circumferentially intervening cold streaks bathe the vanes in relatively cooler combustion gases.

Accordingly, the turbine nozzle is commonly designed with circumferential uniformity having substantially identical nozzle vanes and band segments, in the typical doublet configuration for example. An even number of nozzle vanes is therefore found in the doublet nozzle configuration with two identical vanes in each doublet.

The nozzle vanes have the typical crescent profile with generally concave pressure sides and generally convex suction sides extending axially in chord between opposite leading and trailing edges. The vanes in each doublet define an inboard flow passage therebetween, with the vanes between doublets defining outboard flow passages which include the respective axial splitlines.

The inboard and outboard nozzle passages converge in the downstream direction to a minimum flow area typically defined at the trailing edge of one vane normal to the suction side of the adjacent vane.

The combustion gases are typically discharged at an oblique circumferential swirl angle into the downstream row of turbine rotor blades which rotate the supporting rotor disk in the direction of the blade suction sides relative to the blade pressure sides.

Each nozzle doublet therefore includes a lead vane over which the turbine blades first pass, and a trail vane over which the turbine blades secondly pass during rotation.

The cold and hot streaks from the combustor are channeled axially through the flow passages of the turbine nozzle and therefore similarly bathe the turbine rotor blades in the alternating hot and cold streaks which also affects their performance during operation.

Surrounding the turbine blades is an annular turbine shroud which confines the combustion gases, including the hot and cold streaks. And, the shroud is also segmented circumferentially with identical turbine shroud segments having corresponding hooks supported in a cooperating hanger suspended from a surrounding casing or shroud support.

Accordingly, the nozzle stator vanes, turbine rotor blades, and their shrouds are typically identical in each row thereof and typically include identical cooling circuits therein for their different environments. The vanes, blades, and shrouds use a portion of pressurized air bled from the compressor for cooling thereof and achieving the desired useful life of the engine during operation.

Since the air bled from the compressor is not used in the combustor, the overall efficiency of the engine is decreased. The amount of cooling air bled from the compressor should therefore be minimized for maximizing engine efficiency.

However, the vanes, blades, and shrouds must be designed in conventional practice for identical cooling thereof in each row for protecting the airfoils from the maximum temperatures and heat loads from the hot streaks produced by the combustor notwithstanding the significantly lower temperature of the cold streaks alternating with the hot streaks during operation.

Accordingly, it is desired to provide an improved turbine which preferentially accommodates the hot and cold streaks in the combustion gases for improving performance of the gas turbine engine.

BRIEF DESCRIPTION OF THE INVENTION

A duplex turbine nozzle includes a row of different first and second vanes alternating circumferentially between radially outer and inner bands in vane doublets having axial splitlines therebetween. The vanes have opposite pressure and suction sides spaced apart in each doublet to define an inboard flow passage therebetween, and corresponding outboard flow passages between doublets. The vanes have different patterns of film cooling holes with larger cooling flow density along the outboard passages than along the inboard passages.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
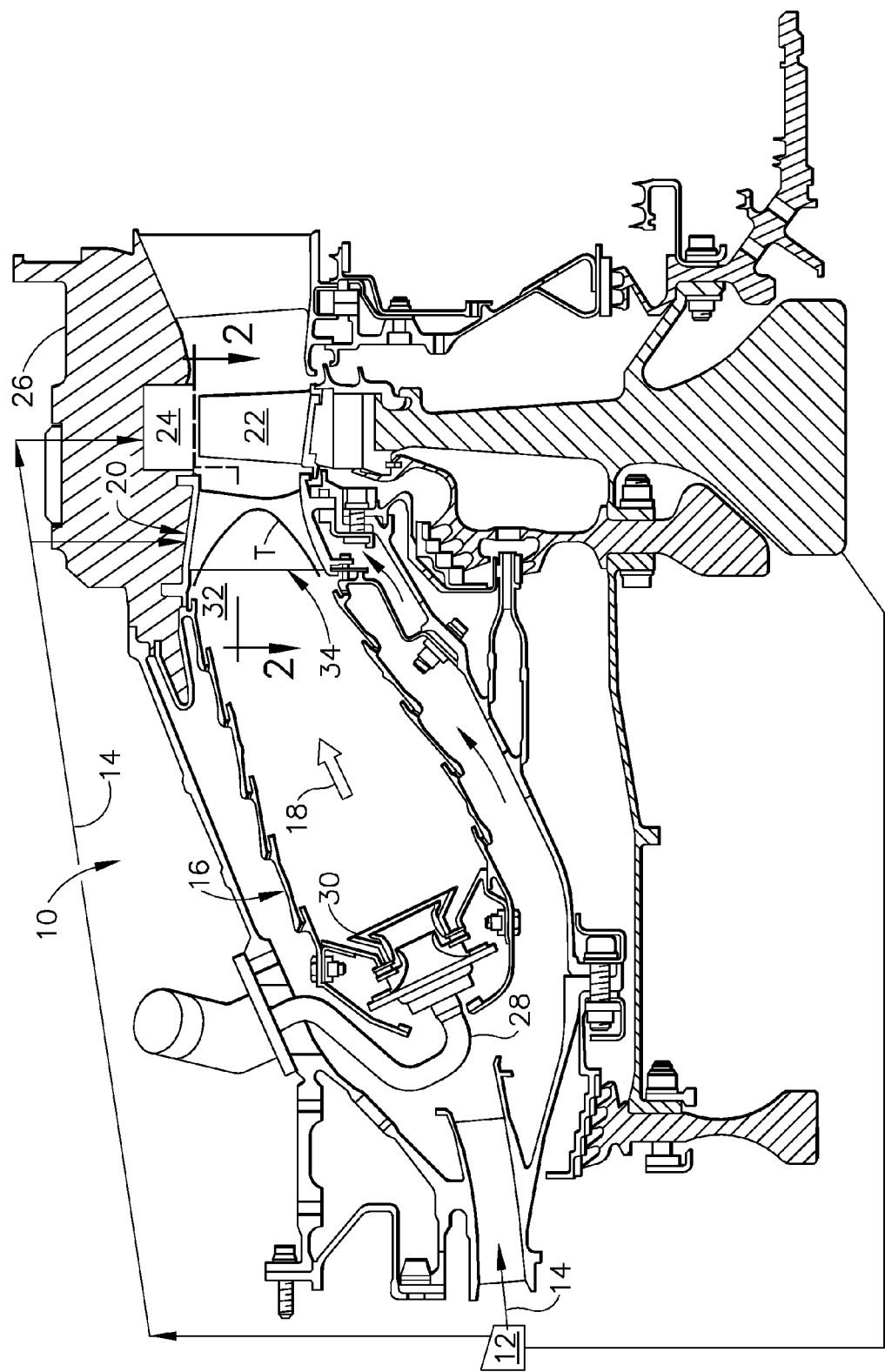
FIG. 1 is axial sectional view of the turbine portion of a gas turbine engine powered by an annular combustor.

Illustrated in FIG. 1 is a portion of a gas turbine engine 10 which is axisymmetrical about a longitudinal or axial centerline axis. The engine includes a multistage axial compressor 12 for pressurizing air 14.

An annular combustor 16 is mounted downstream from the compressor and mixes the pressurized air 14 with fuel which is ignited for generating hot combustion gases 18.

The combustion gases are discharged from the combustor into an annular first stage turbine nozzle 20 in the HPT which in turn channels the gases into a row of first stage turbine rotor blades 22 directly following the nozzle. The blades are suitably mounted to the perimeter of a supporting rotor disk which in turn is joined to the rotor of the compressor 12 which is powered by the turbine blades during operation.

Surrounding the turbine blades is an annular turbine shroud 24 conventionally mounted to a surrounding turbine casing 26.

The LPT is located downstream of the HPT, and is shown in part, and includes a turbine nozzle (shown) followed by additional rotor blades that typically power an upstream fan (not shown) in an aircraft engine configuration. In alternate embodiments, the LPT may power an external drive shaft for marine and industrial applications.

The combustor 16 illustrated in FIG. 1 includes a radially outer combustor liner and a coaxial, radially inner combustor liner defining an annular combustion zone therebetween. The liners extend downstream from an annular dome and are suitably mounted inside a surrounding combustor casing.

The combustor dome includes a row of fuel injectors 28 extending through cooperating air swirling cups 30 which provide an atomized mixture of fuel and air inside the combustor which is then suitably ignited for generating the hot combustion gases 18 during operation.

The annular combustor 16 includes an annular outlet 32 at the downstream, aft end thereof through which the hot combustion gases 18 are discharged during operation. The row of fuel injectors 28 is disposed at the upstream or forward dome end of the combustor, with the individual injectors being uniformly spaced apart circumferentially from each other around the dome.

Figure 2:
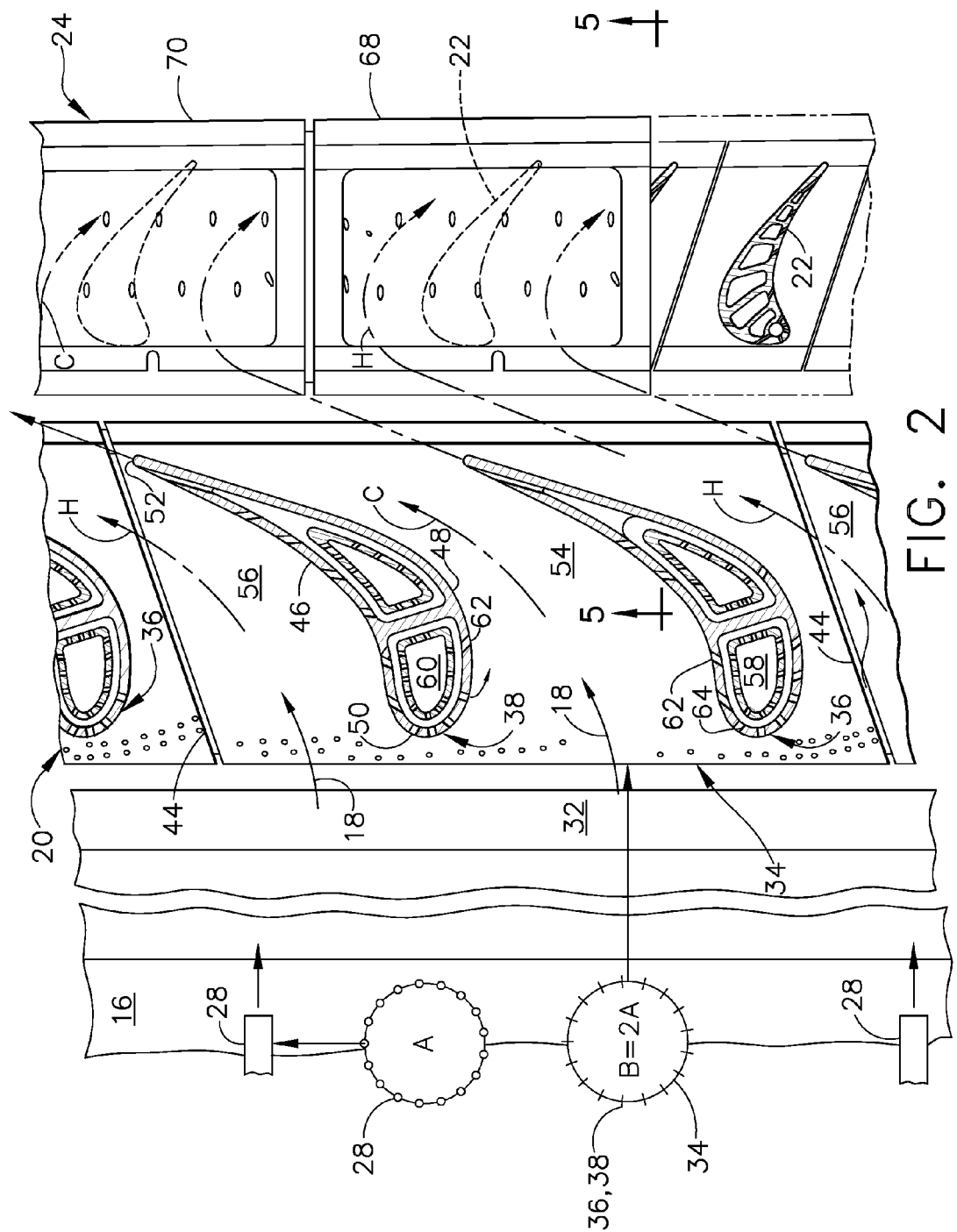
FIG. 2 is a radial sectional, planiform view of the high pressure turbine following the combustor illustrated in FIG. 1 and taken along line 2-2.

Accordingly, the combustion gases 18 generated in the combustor during operation will experience relatively hot streaks H, shown in FIG. 2, directly axially aft from the individual fuel injectors 28 with corresponding relatively cooler combustor cold streaks C disposed circumferentially therebetween. The hot and cold streaks therefore will flow downstream through the turbine nozzle 20 and then through the first row of turbine rotor blades 22 which extract energy therefrom to rotate the supporting disk and power the compressor.

The annular turbine nozzle 20 is shown in axial view in FIG. 1 and in planiform sectional view in FIG. 2 in cooperation with the upstream combustor 16 and the downstream turbine blades 22 surrounded by the turbine shroud 24. The nozzle 20 is segmented circumferentially in a row of nozzle doublets 34, each including two hollow vanes 36,38 extending radially between outer and inner integral bands 40,42.

The first and second stator vanes 36,38 alternate circumferentially in a row thereof to define the duplex nozzle. The outer and inner bands 40,42 are circumferentially arcuate and collectively define the full perimeter of the nozzle.

The two vanes and band segments may be integrally formed in a unitary casting or may be separately manufactured and suitably joined together, by brazing for example, to form a unitary component of the nozzle.

The annular nozzle is segmented circumferentially by corresponding axial splitlines 44 which are defined by corresponding endfaces at the opposite circumferential ends of the outer and inner bands 40,42 in each doublet.

Figure 3:
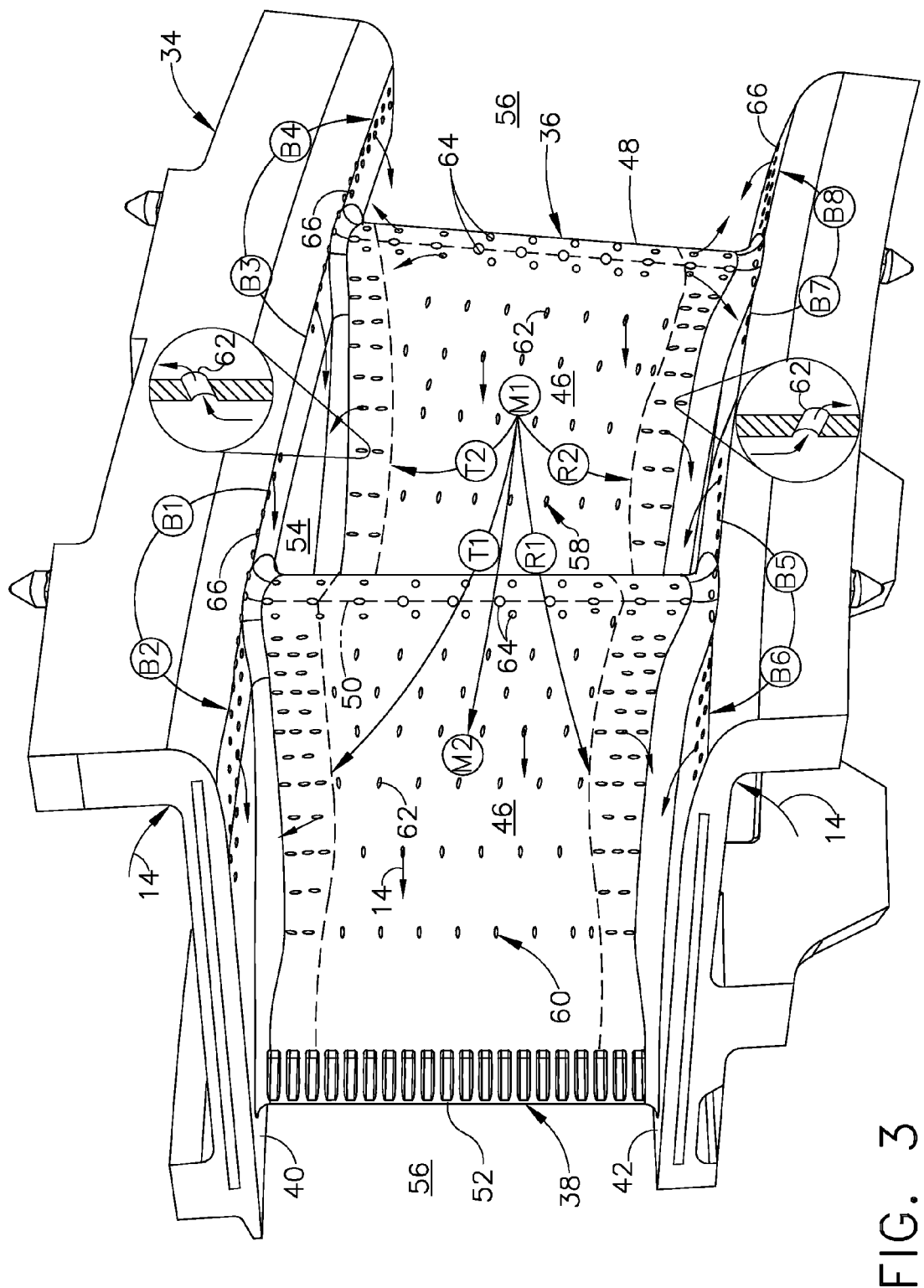
FIG. 3 is an isometric view of an exemplary doublet in the first stage turbine nozzle illustrated in FIGS. 1 and 2 showing vane pressure sides from the leading edges thereof.

FIG. 3 illustrates two of the endfaces having axial slots therein in which are disposed conventional spline seals illustrated in the assembly of FIG. 2. Accordingly, the full row of nozzle doublets and vanes defines a fully annular turbine nozzle segmented circumferentially in the outer and inner bands by the corresponding splitlines having the spline seals therein for maintaining the circumferential continuity of the nozzle.

The row of alternating first and second vanes 36,38 illustrated in FIGS. 2 and 3 have identical aerodynamic profiles and define substantially identical flow passages therebetween. For example, each of vanes 36,38 has a generally concave pressure side 46 and a circumferentially opposite, generally convex suction side 48 extending axially in chord between opposite leading and trailing edges 50,52. The opposite sides of each vane extend in span over the radial height of the nozzle between the outer and inner bands 40,42.

Each nozzle doublet illustrated in FIG. 2 includes only the two vanes 36,38 integrally joined with their respective arcuate bands 40,42. The row of turbine blades 22 also illustrated in FIG. 2 rotates during operation with the corresponding convex, suction side thereof leading the opposite concave pressure side thereof.

In this way, the first nozzle vane 36 in each doublet defines the leading or lead vane over which first passes turbine blades during rotation, and the second nozzle vane 38 defines the trail or trailing vane in each nozzle segment.

The pressure side 46 of the first vane 36 directly faces the opposite suction side 48 of the second vane 38 and defines circumferentially therebetween with the bands an inboard flow passage 54 without splitline. The two opposing vane sides defining the inboard passage 54 are also referred to as inboard vane sides accordingly.

Correspondingly, the suction side 48 of the first vane 36 and the pressure side 46 of the second vane 38 face circumferentially outwardly or outboard toward the respective endfaces and axial splitlines 44 of the next adjacent nozzle doublets. In this way, the suction side 48 of the first vane 36 cooperates with the pressure side 46 of the second vane 38 on the next doublet to define with the bands corresponding outboard flow passages 56 between each of the nozzle doublets to include the respective axial splitlines 44 therein.

The suction side 48 of the first vane and the pressure side 46 of the second vane in each doublet therefore define outboard vane sides, and along with the corresponding outer and inner bands define corresponding ones of the outboard flow passages which include the splitlines 44, whereas the inboard flow passages 54 inside each nozzle doublet are devoid of any axial splitline therein.

A significant improvement in performance of the duplex turbine nozzle 20 illustrated in FIG. 2 may be obtained by circumferentially aligning or clocking the individual fuel injectors 28 from the combustor with corresponding ones of the outboard flow passages 56. Correspondingly, none of the fuel injectors 28 is clocked or circumferentially aligned with any of the inboard flow passages 54 in the full row of nozzle doublets.

This clocking or circumferential alignment of the nozzle passages with the fuel injectors may be readily accomplished by having two times as many nozzle vanes 36,38 as the number of fuel injectors 28, and fixedly mounting the nozzle doublets 34 so that the outboard passages 56 are axially aligned downstream with corresponding ones of the fuel injectors 28. Correspondingly, the inboard flow passages 54 are axially aligned downstream with the circumferential midpoints between any two adjacent fuel injectors 28.

Clocking the row of fuel injectors 28, which generate the hot streaks during operation, with the row of nozzle vanes 36,38 permits preferential cooling of the individual vanes with different performance for better utilizing the limited amount of pressurized cooling air bled from the compressor.

More specifically, each of the first and second vanes 36,38 shown in FIGS. 1-3 has a respective first and second cooling circuit 58,60 for preferentially cooling the vane sides. The two cooling circuits 58,60 may share common features, but are suitably modified differently for differently cooling the different sides of the different first and second vanes bounding the inboard and outboard flow passages.

Common features of the two cooling circuits 58,60 include the forward and aft cavities inside each vane separated by an imperforate bridge or rib integrally cast with the opposite vane sides. The two cavities are suitably fed with pressurized air 14 from the compressor during operation to provide cooling air thereto.

Each vane may include a pair of conventional perforate impingement baffles therein for enhancing internal impingement cooling of the vanes.

Also common to the cooling circuits 58,60 are a multitude of conventional film cooling holes 62 which extend through the respective pressure and suction sides of each of the two vanes in each doublet for discharging the spent cooling air therefrom. Typical film cooling holes are inclined at a shallow inclination angle and discharge pressurized cooling air therethrough at a shallow discharge angle which forms a thermally insulating layer of air over the external surface of the vane.

Although the duplex vanes 36,38 share the common film cooling holes 62, those holes are arranged in preferentially different first and second patterns thereof in the corresponding first and second cooling circuits 58,60. In particular, the film cooling holes 62 are arranged in the two vanes 36,38 with larger or greater cooling flow density (CFD) along the outboard passages 56 than along the inboard flow passages 54. Furthermore, the holes 62 may also be arranged with larger CFD near one or both of the two bands 40,42 than along the midspan regions of the vanes.

The cooling flow density (CFD) is defined as the cooling flow per unit area in the vane sidewalls, for example. The limited quantity of pressurized cooling air 14 bled from the compressor is distributed through the various engine components for selective cooling thereof.

Cooling occurs through each individual cooling hole and is a function of the flow diameter of the hole and distribution of the holes by lateral spacing or pitch. Larger holes carrying more cooling flow locally increase cooling. More cooling holes in a unit area also increases local cooling. However, the use of more cooling air correspondingly decreases the overall efficiency of the engine since the cooling air bled from the compressor is not used in the combustion process.

Accordingly, by preferentially redistributing the limited number of cooling holes in the turbine nozzle, the limited cooling air may be better matched to the different heat flux from the combustion gases.

Since the hot streaks H are aligned or clocked downstream from corresponding ones of the fuel injectors 28 illustrated in FIG. 2, the outboard passages 56 are preferentially clocked therewith. And, since the cold streaks C are clocked offset in the middle between adjacent fuel injectors 28, the inboard flow passages 54 are preferentially clocked therewith.

Clocking may be effected by having an equal number A of fuel injectors 28 and nozzle doublets 34, with the total number B of nozzle vanes 36,38 in the full row being exactly twice the number of fuel injectors (B=2A).

This clocking configuration of the duplex turbine nozzle 20 with the fuel injectors 28 from the combustor will ensure hot streak travel through the outboard passages and cold streak travel through the inboard passages alternating therewith.

Accordingly, the limited number of film cooling holes 62 in the duplex vanes 36,38 may then be redistributed from conventional and identical distributions thereof in all the vanes to different distributions with larger CFD bounding the outboard passages 56 through which the hot streaks flow, and lower CFD bounding the inboard passages through which the cold streaks flow.

In this way, more cooling air is preferentially used in the outboard passages for protection against the higher heat loads from the hot streaks, with less cooling air being used in the inboard passages wherein the cold streaks generate less heat flux. The resulting preferential cooling of the duplex vanes can reduce thermal stress therein and improve durability, or may allow for a reduction in the total amount of air diverted from the compressor for cooling the turbine nozzle.

Furthermore, the spent cooling air is discharged from the cooling holes with more flow volume in the outboard passages than in the inboard passages and can significantly reduce the circumferential variation in temperature of the combustion gases being discharged through the nozzle. And, since additional cooling air leaks past the conventional spline seals at the nozzle splitlines 44, additional dilution of the hot streaks may be obtained for further controlling the circumferential variation of the combustion gases.

Figure 4:
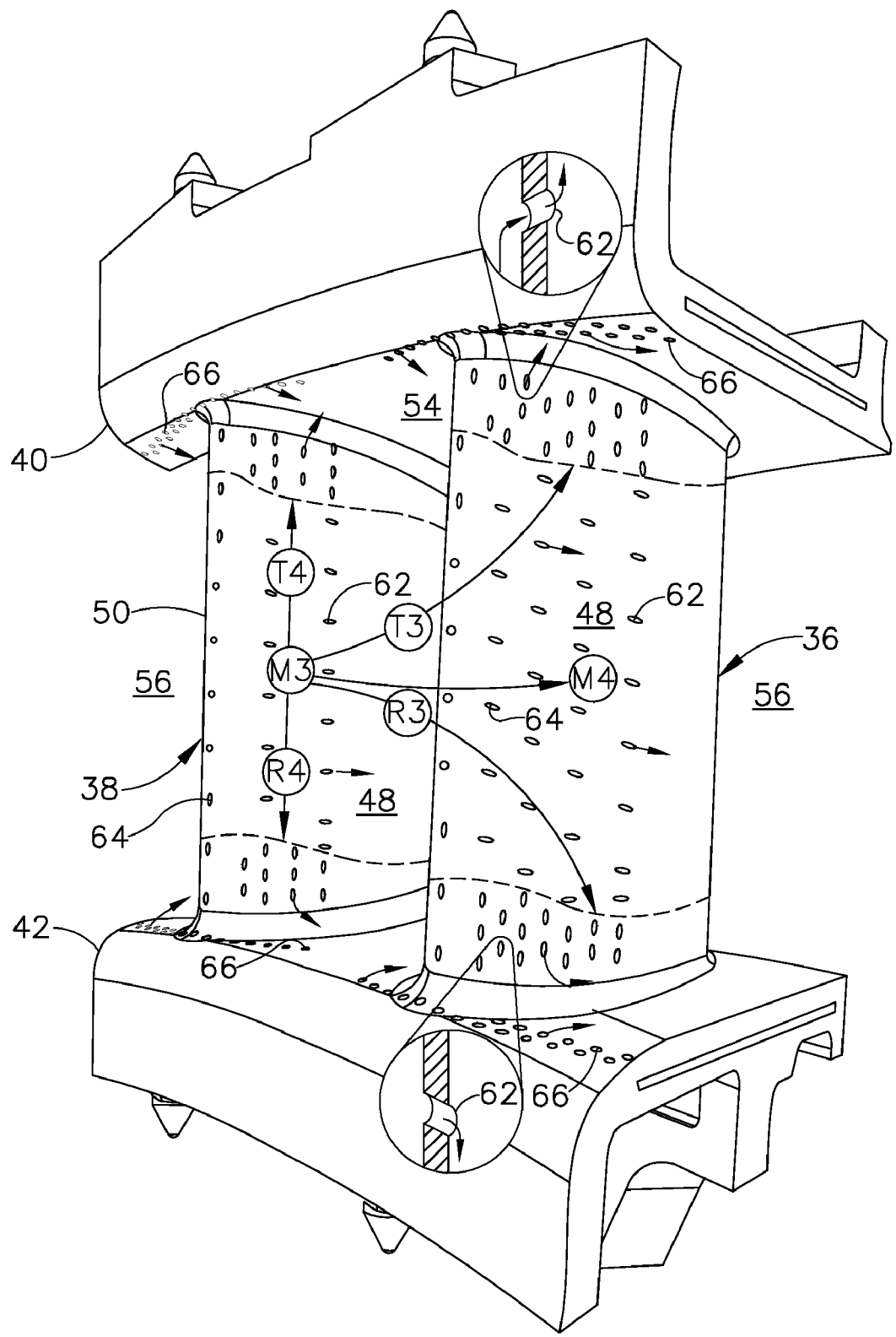
FIG. 4 is an isometric view of the exemplary nozzle doublet illustrated in FIG. 3 showing suction sides of the vanes from the leading edge.

Exemplary distributions of the film cooling holes 62 in the different cooling circuits 58,60 are shown in FIGS. 3 and 4. An additional advantage of the different distributions is the ability to obtain larger CFD near one or both of the radially outer and inner bands 40,42 of the duplex nozzle relative to the corresponding midspan regions of the vanes. In this way, the radial temperature profile of the combustion gases may also be varied in conjunction with the circumferential temperature profile.

FIG. 1 illustrates schematically the typical center-peaked parabolic temperature profile T of the combustion gases discharged from the annular outlet 32 of the combustor. The radially centered peak is preferred for reducing temperature and heat flux from the combustion gases near the radially outer and inner bands.

However, the peak of the discharged combustion gases may be biased radially outwardly toward the outer band or radially inwardly toward the inner band depending upon specific engine design. Or, the peak may be less pronounced and flatter near the midspan in yet other designs.

Accordingly, the redistribution of the finite number of film cooling holes 62 in the duplex turbine nozzle may be additionally used to advantage to tailor or control the radial profile of the combustion gases discharged from the combustor depending upon the specific engine design.

FIGS. 3 and 4 illustrate schematically representative regions or zones along the opposite pressure and suction sides of the two vane 36,38 in each doublet. Midspan regions M1,2 are found on the corresponding pressure sides of the two vanes 36,38, and corresponding midspan regions M3,4 are found on the opposite suction sides of the two vanes 38,36, respectively. The midspan regions include the radial midspan of each vane and extend radially inwardly to about 30 percent span height from the inner band and radially outwardly to about 70 percent from the inner band, or to about 30 percent from the outer band.

Correspondingly, the two vanes 36,38 have root zones or regions R1,2 on the pressure sides thereof, and root regions R3,4 on the suction sides thereof which bound the lower end of the midspan regions at the root ends of the vanes.

The two vanes also include corresponding tip regions T1,2 on the pressure sides and T3,4 on the suction sides which bound the outer end of the midspan regions below the outer bands 40.

In this way, each of the duplex vanes 36,38 has three general regions on each of its two sides corresponding with the generally large midspan regions bound by the relatively small root and tip regions which adjoin the corresponding inner and outer bands.

FIGS. 3 and 4 also illustrate schematically an exemplary embodiment in which a given number of the film cooling holes 62 may be redistributed in the two vanes in each doublet from otherwise identical distribution patterns on the respective pressure and suction sides thereof found in conventional engines, to different distributions for better matching the different heat flux from the hot and cold streaks during operation.

Fundamentally, film cooling holes 62 from the pressure side of the lead vane 36 may be redistributed to the pressure side of the trail vane 38 for increasing the CFD thereof while lowering the CFD on the lead vane.

Correspondingly, FIG. 4 illustrates the redistribution of the film cooling holes 62 from the suction side of the trail vane 38 to the corresponding suction side of the lead vane 36 for increasing the CFD thereof while lowering it on the trail vane.

In this way, greater CFD is provided by the redistributed film cooling holes 62 which bound the outboard flow passages 56 than those which bound the inboard flow passages 54.

In a preferred embodiment, the film cooling holes 62 are distributed over a midspan region M2 of the pressure side 46 of the second vane 38 with a larger CFD than a corresponding midspan region M1 of the pressure side 46 of the first vane 36. And, the film cooling holes 62 are further distributed over a midspan region M4 of the suction side 48 of the first vane 36 with a larger CFD than a corresponding midspan region M3 of the suction side 48 of the second vane 38.

Furthermore, the holes 62 may be further distributed over the root regions R1-4 or tip regions T1-4 of the two vanes 36,38 with a locally larger CFD than the corresponding midspan regions M1-4 thereof.

In the exemplary embodiment illustrated in FIGS. 3 and 4, the film cooling holes 62 are distributed over both root and tip regions R,T,3,1 of the suction side 48 of the first vane 36 and the pressure side 46 of the second vane 38 with larger CFD than over the midspan regions M4,2 thereof. This corresponds with the outboard flow passages 56 which bound the hot streaks.

Correspondingly, the film cooling holes 62 are also distributed over both the root and tip regions R,T,2,4 of the pressure side 46 of the first vane 36 and the suction side 48 of the second vane 38 with larger CFD than over the corresponding midspan regions M1,3 thereof. This corresponds with the inboard flow passages 54 which bound the cold streaks.

FIG. 3 illustrates schematically that the limited number of film cooling holes 62 originally provided on the pressure side 46 of the lead vane 36 may be preferentially redistributed in part to any of the three zones M2,R1,T1 on the corresponding pressure side of the trail vane 38, and even redistributed in part to the root and tip regions R2,T2 of the pressure side 46 of the lead vane 36 itself.

Correspondingly, FIG. 4 illustrates schematically that the limited number of film cooling holes 62 originally provided on the suction side 48 of the trail vane 38 may be redistributed in part to the corresponding suction side 48 of the lead vane 36 in the midspan, root, and tip regions M4,R3,T3 thereof as desired. And, some of those holes may even be redistributed to the corresponding root and tip regions R4,T4 of the suction side 48 of the trail vane 38 itself.

Since typical film cooling holes have a nominal flow diameter of about 15-20 mils (0.38-0.51 mm) it is preferred to rearrange the distribution thereof, instead of locally increasing the flow diameter thereof. In alternate designs, however, the flow diameter size of the individual film cooling holes may be varied for achieving the desired CFD disclosed above.

However, in the preferred embodiment illustrated in FIGS. 3 and 4, the CFD is preferably controlled by the quantity or number of uniform-size film cooling holes 62 per unit area, with more of the holes 62 being used to increase cooling flow therethrough for effecting the larger CFD. And, the locally larger quantity of film cooling holes 62 in the preferred regions disclosed above may be obtained by removing some of the film cooling holes from the corresponding midspan regions M1,3 bounding the inboard flow passages through which the combustion cold streaks travel during operation.

FIGS. 3 and 4 also illustrate preferred orientation or inclination of the film cooling holes 62 which are inclined through the thin sidewalls of the pressure and suction sides of the vanes. The individual holes 62 are themselves typically cylindrical with a small diameter, and inclined at shallow inclination angles which result in oval or elliptical outlets on the external surface of the vanes, in contrast with a circular outlet due to a perpendicular or normal hole.

Accordingly, the film cooling holes 62 in the midspan regions M1-4 on both sides of each vane 36,38 are preferably angled or inclined aft in chord between the leading and trailing edges and form generally horizontal oval outlets which discharge the cooling air 14 in the axially aft direction.

In contrast, the film cooling holes 62 in the root and tip regions R1-4,T1-4 on both sides of both vanes 36,38 are preferably angled radially in span with vertical oval outlets being generally perpendicular with the horizontal oval outlets of the midspan film cooling holes. The root and tip holes 62 may also be angled in part vertically and in part aft for compound inclination thereof to discharge the spent cooling air both aft and radially outwardly toward the outer band and radially inwardly toward the inner band.

Preferably, the film cooling holes 62 are angled up toward the outer band 40 in the four tip regions T1-4 of the two vanes 36,38 to discharge the spent cooling air radially outwardly therefrom. And, the film cooling holes 62 in the four root regions R1-4 are preferably angled down toward the inner band 42 to discharge the spent cooling air radially inwardly therefrom.

In this way, the substantial momentum from the jets of spent cooling air being discharged from the film cooling holes 62 in the root and tip regions of each vane may be additionally used for diluting the combustion gases channeled through the flow passages 54,56 and further control the radial temperature profile thereof. In particular, the local increase in spent cooling air near the outer and inner bands can be used to increase the slope of the radial temperature profile T in FIG. 1 by locally reducing the temperature of the combustion gases near the bounding inner and outer bands.

In the preferred embodiment illustrated in FIG. 3, the two cooling circuits 58,60 for the two vanes 36,38 preferably also include similar patterns of showerhead film cooling holes 64 along the corresponding leading edges 50 thereof. Three exemplary radial rows or columns of the showerhead holes 64 are illustrated schematically, and are representative of any suitable number of columns for specific turbine designs, as desired.

The showerhead holes 64 discharge spent cooling air forwardly into the incident combustion gases and provide enhanced local cooling of the leading edge itself.

The showerhead holes 64 near the outer band 40 are preferably angled up with vertical oval outlets, whereas the showerhead holes 64 near the inner band 42 are preferably angled down with vertical oval outlets. In this way, the jets of cooling air discharged along the leading edge may be additionally used to advantage to further control the radial profile of the combustion gases by locally diluting or cooling those gases near the outer and inner bands.

FIG. 3 also illustrates a row of pressure side trailing edge outlet holes which may have any conventional configuration, and typically are identical or uniform along the entire trailing edge from root to tip of the vanes. Since the trailing edge holes are at the aft ends of the vanes, they have little if any effect on the radial temperature profile of the combustion gases.

Accordingly, the film cooling holes 62 along both sides of each vane may be used to preferentially cool the vanes, and preferentially control both the circumferential and radial temperature profiles of the combustion gases as they flow through the inboard and outboard flow passages 54,56. And, the leading edge showerhead holes 64 may also be used to advantage in further controlling the radial temperature profile of the combustion gases.

Since both the vanes and bands bound the flow passages 54,56, additional improvement may be obtained by introducing different patterns of band cooling holes 66 extending radially through the outer and inner bands 40,42 preferably near the leading edges thereof corresponding with the leading edges of the vanes. The band holes 66 are provided with pressurized air 14 suitably bled from the compressor and channeled separately to the two bands. And, the patterns of band holes 66 are selected for effecting larger CFD along the outboard flow passages 56 than along the inboard flow passages 54 near the vane and band leading edges.

For example, the band holes 66 are preferably distributed along the leading edges of the bands in larger quantity on the suction side 48 of the lead vanes 36 than on the pressure side 46 thereof. And, the band holes 66 are larger in quantity also on the pressure side 46 of the trail vanes 38 than on the suction sides 48 thereof.

FIG. 3 illustrates schematically four zones B1-4 along the leading edge of the outer band 40 corresponding with the opposite pressure and suction sides of the two vanes; and four zones B5-8 along the leading edge of the inner band 42, again corresponding with the opposite sides of the two vanes.

In a conventional configuration utilizing similar band holes 66, such holes would have identical patterns or distributions on opposite sides of the two vanes and along the outer and inner bands due to the requirement of uniformity in configuration and cooling design.

However, by clocking the inboard and outboard flow passages 54,56 with the cold and hot streaks as described above, the patterns of the band holes 66 may be preferentially changed for improving local cooling of the bands themselves and also controlling the temperature profile of the combustion gases.

FIG. 3 illustrates schematically that the band holes 66 may be preferentially redistributed from the inboard flow passages 54 to the outboard flow passages 56 for increasing the CFD around the corresponding hot streaks. The band holes 66 may be redistributed from the suction side of the trail vane 38 to the pressure side thereof between the corresponding zones B1-2 and B5-6 at both bands. And, the band holes 66 may be redistributed from the pressure side of the lead vane 36 to the suction side thereof in the corresponding band zones B3-4 and B7-8 at both bands.

In this way, the number of band holes 66, like the number of film cooling holes 62, may be locally increased in the outboard flow passages and locally decreased in the inboard flow passages 54 to match the different heat flux from the combustion hot and cold streaks.

By clocking the inboard and outboard flow passages with the upstream fuel injectors as described above, the limited number of cooling holes of various forms found in the turbine nozzle itself may be preferentially redistributed for not only improving cooling performance of the turbine nozzle itself, but also controlling the temperature profile of the combustion gases for improving thermodynamic performance in downstream turbine stages.

As initially shown in FIGS. 1 and 2, the combustion gases are preferentially channeled by the turbine nozzle vanes 36,38 into the downstream stage of turbine rotor blades 22 which extract energy therefrom. Since the turbine blades rotate during operation, they mix together the hot and cold streaks while enjoying the advantages of the locally lower temperature thereof near the radially inner and outer flowpath boundaries.

Figure 5:
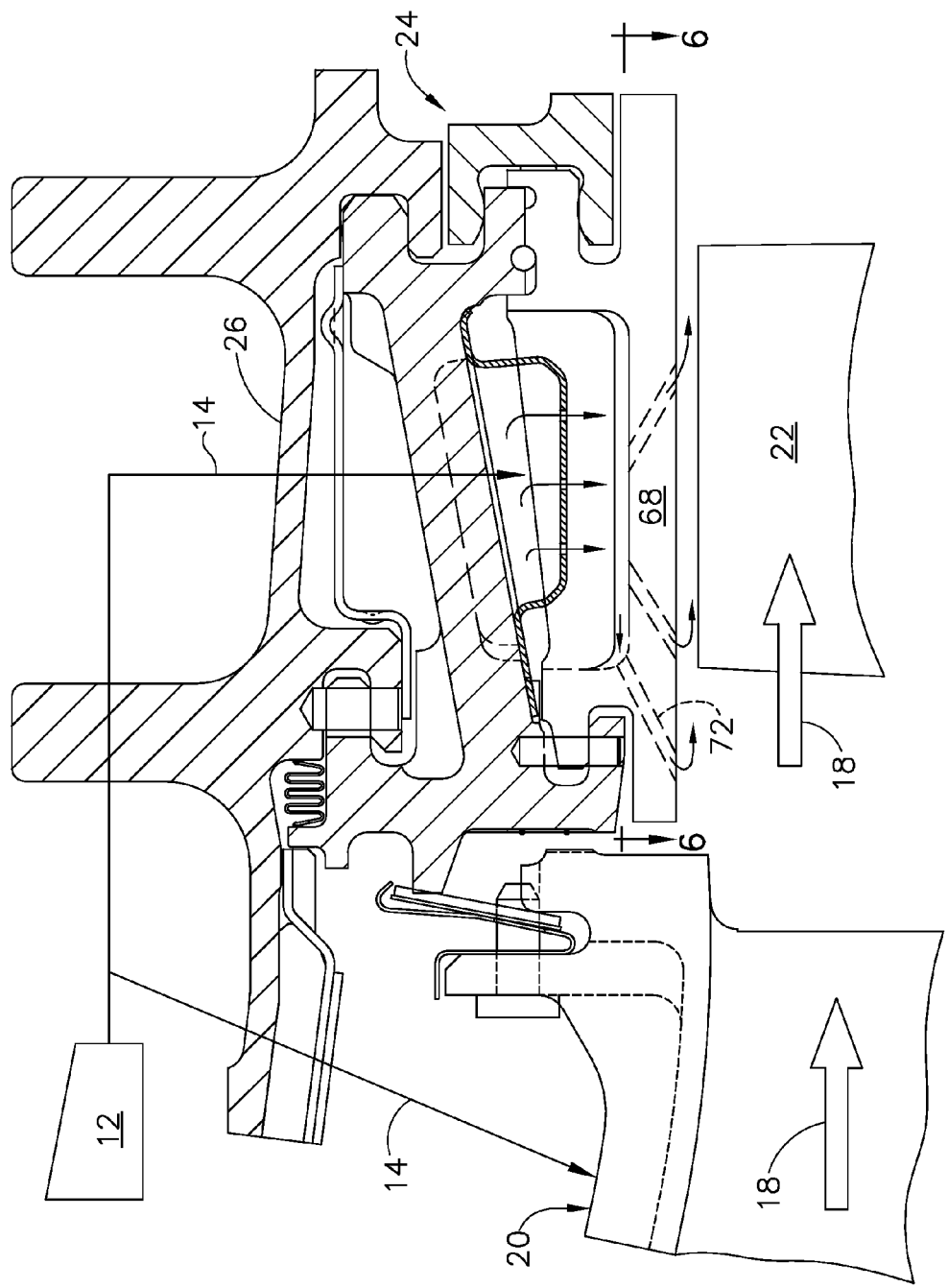
FIG. 5 is an enlarged axial sectional view of the turbine shroud illustrated in FIG. 2 and taken along line 5-5.
Figure 6:
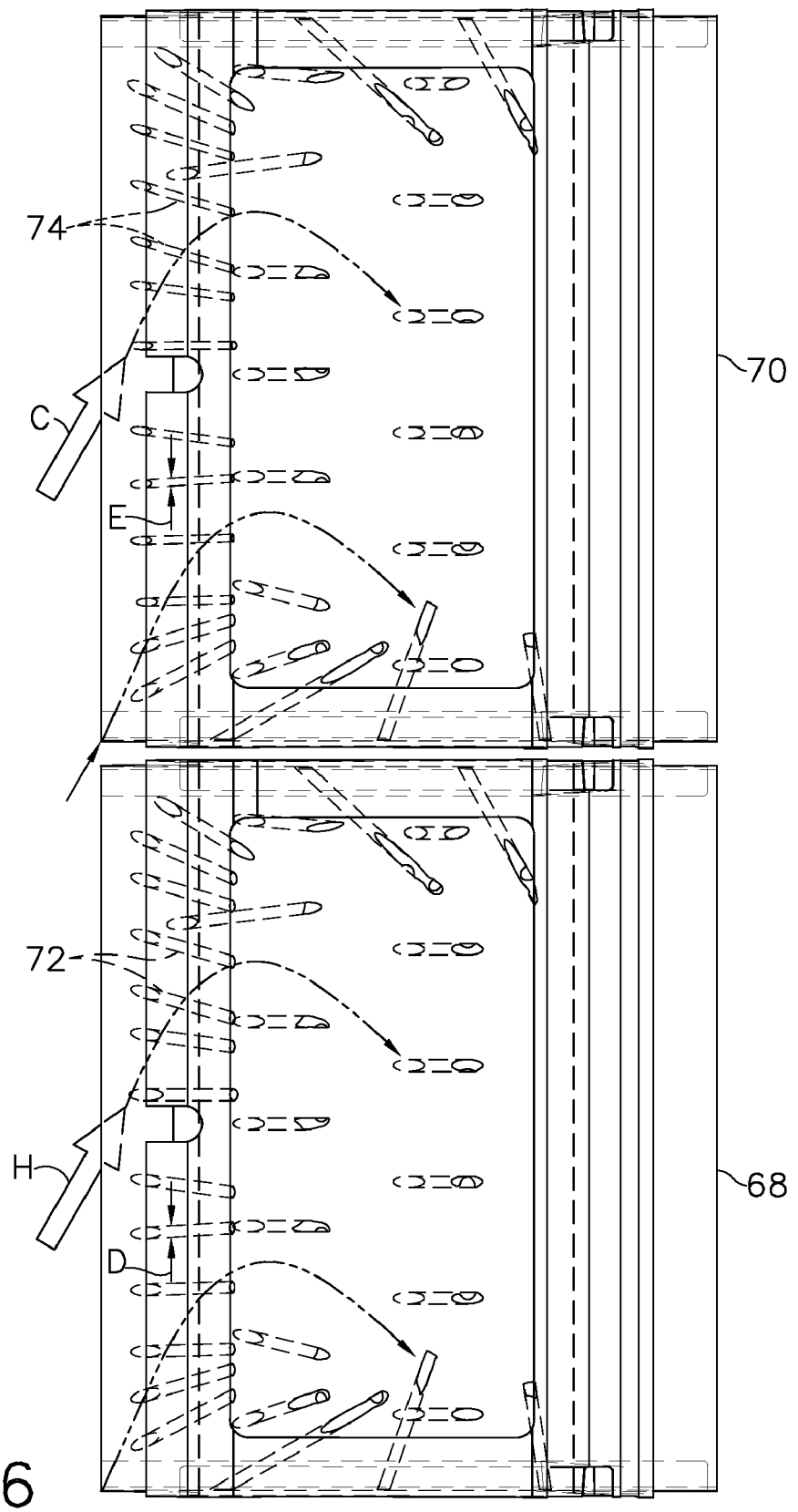
FIG. 6 is a top planiform view of exemplary duplex segments of the turbine shroud illustrated in FIG. 5 and taken along line 6-6.

FIGS. 5 and 6 illustrate in more detail the duplex turbine shroud 24 which preferentially cooperates with the duplex turbine nozzle 20, with both being clocked with the hot and cold combustion gas streaks as described above.

FIG. 2 illustrates that the first shroud segments 68 are correspondingly clocked with the outboard flow passages 56 for receiving the combustion hot streaks H therefrom. And, the second shroud segments 70 alternate circumferentially with the first segments 68, and are correspondingly clocked with the inboard flow passages 54 for receiving the combustion cold streaks C.

The combustion gases leave the skewed nozzle vanes 36,38 at the oblique discharge swirl angle. And, the corresponding shroud segments 68,70 are circumferentially aligned with the nozzle vanes so that the hot streaks H flow within the bounds of the first segments 68 and the cold streaks C flow within the bounds of the second segments 70.

The shroud segments 68,70 may be identical in configuration and size and include forward and aft hooks which suitably mount the segments to corresponding hangers from the outer casing 26 illustrated in FIG. 5 in a conventional manner.

Furthermore, the shroud segments 68,70 may have identical cooling configurations except as modified for conforming with the different hot and cold streaks bound by the segments.

More specifically, the first and second shroud segments 68,70 have corresponding patterns of cooling holes extending radially therethrough including first and second inclined film cooling holes 72,74 respectively. The first cooling holes 72 are arranged in a row between splitline ends of the segments, and face upstream below the forward hook of the first segments 68.

Similarly, the second cooling holes 74 are arranged in a row between splitline ends of the segments, and also face upstream under the forward hook of the second segments 70.

In this way, the first and second cooling holes 72,74 provide the first, upstream rows of cooling protection along the leading edges of the segments which extend in overhangs forwardly of the leading edges of the turbine rotor blades 22.

The row of first holes 72 in the first segments 68 have a larger CFD to withstand the hot streaks as compared with the smaller CFD of the row of second holes 74 in the second segments 70 for protection against the cold streaks.

The number of first and second holes 72,74 in the two segments may be identical to each other, such as nine, with the flow diameter D of the first holes 72 being suitably larger than the flow diameter E of the second holes 74. The first diameter D may be at the upper end of the typical 15-25 mil (0.38-0.63 mm) range for the shroud cooling holes, whereas the smaller second diameter E may be at the lower end of this range.

In this way, the first shroud segments 68 have larger cooling flow density along the leading edge thereof for increased cooling against the greater heat flux from the hot streaks H. And, the second holes 74 along the leading edge of the second segments 70 have correspondingly less cooling flow density for providing effective cooling against the reduced heat flux from the cold streaks C.

The limited amount of cooling air provided to the duplex turbine shroud 24 may therefore be preferentially redistributed over the segments which bound the different hot and cold streaks.

The two segments 68,70 may have additional rows of film cooling holes, such as the two rows illustrated, and corner cooling holes which may be identical to each other for similarly cooling the remainder of the shroud segments.

By matching the collective number of shroud segments 68,70 with the collective number of nozzle vanes 36,38 which vanes are double the number of fuel injectors 28 illustrated schematically in FIG. 2, both the duplex turbine nozzle 20 and duplex turbine shroud 24 may be preferentially clocked circumferentially with the fuel injectors 28 to channel the hot streaks H through the outboard flow passages 56 and the cold streaks C through the inboard flow passages 54.

By so confining the flow of the hot and cold streaks, the corresponding distribution of cooling holes in the nozzle and shroud may be tailored to provide increased cooling over the hot streaks and decreased cooling over the cold streaks. Cooling efficiency is therefore improved and can result in reduced thermal stresses in the flowpath components.

Furthermore, the redistribution of the cooling holes may be used to additional advantage in controlling both the circumferential and radial temperature profiles of the combustion gases for additional advantage in the various turbine components subject thereto.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A gas turbine engine apparatus comprising:
   an annular combustor having a row of fuel injectors;
   a duplex turbine nozzle including a row of different first and second vanes alternating circumferentially between radially outer and inner bands in vane doublets having axial splitlines therebetween;
   said vanes having opposite pressure and suction sides extending axially in chord between opposite leading and trailing edges, and spaced apart to define inboard flow passages therebetween without said splitlines, and corresponding outboard flow passages at opposite ends of said doublets including said splitlines; and
   said vanes have different patterns of film cooling holes with larger cooling flow density along said outboard passages than along said inboard passages.

2. An apparatus according to claim 1 wherein said outboard passages are clocked with said fuel injectors for receiving hot combustion streaks therefrom, and said inboard passages are clocked offset with said injectors for receiving cold combustion streaks from the spaces therebetween.

3. An apparatus according to claim 2 wherein:
   said film cooling holes are distributed over a midspan region of said pressure side of said second vanes with a larger CFD than a corresponding midspan region of said pressure side of said first vanes; and
   said film cooling holes are distributed over a midspan region of said suction side of said first vanes with a larger CFD than a corresponding midspan region of said suction side of said second vanes.

4. An apparatus according to claim 3 wherein said film cooling holes are further distributed over a root or tip region of said vanes with a larger CFD than said midspan regions thereof.

5. An apparatus according to claim 4 wherein said film cooling holes are distributed over both said root and tip regions of said suction side of said first vanes and said pressure side of said second vanes with larger CFD than over said midspan regions thereof.

6. An apparatus according to claim 5 wherein said film cooling holes are distributed over both said root and tip regions of said pressure side of said first vanes and said suction side of said second vanes with larger CFD than over said midspan regions thereof.

7. An apparatus according to claim 4 further comprising:
   a row of turbine blades following said duplex nozzle; and
   a duplex turbine shroud surrounding said blades and including a row of different first and second shroud segments alternating circumferentially around said blades.

8. An apparatus according to claim 7 wherein:
said first and second shroud segments have corresponding patterns of cooling holes with larger CFD along said first segments than along said second segments; and
said first segments are clocked with said outboard passages, and said second segments are clocked with said inboard passages.

9. An apparatus according to claim 8 wherein said film cooling holes are:
angled aft in chord between said leading and trailing edges in said midspan regions of said vanes;
angled up in radial span toward said outer band in said tip regions of said vanes; and
angled down in radial span toward said inner band in said root regions.

10. An apparatus according to claim 9 wherein:
said vanes further include patterns of showerhead cooling holes along said leading edges thereof angled up near said outer band and angled down near said inner band; and
said outer and inner bands include patterns of band holes having larger CFD along said outboard passages than along said inboard passages.

11. A turbine nozzle comprising:
first and second vanes extending in span between radially outer and inner bands in a doublet;
said vanes having opposite pressure and suction sides extending axially in chord between opposite leading and trailing edges, and spaced apart to define an inboard flow passage therebetween, and corresponding outboard flow passages at opposite ends of said doublet;
said first vane having a first cooling circuit including a first pattern of film cooling holes, and said second vane having a different second cooling circuit including a second pattern of film cooling holes for channeling cooling air therethrough; and
said film cooling holes being arranged in said vanes with larger cooling flow density along said outboard passages than along said inboard passage, and larger CFD near one of said bands than along the midspans of said vanes.

12. A nozzle according to claim 11 wherein:
said film cooling holes are distributed over a midspan region of said pressure side of said second vane with a larger CFD than a corresponding midspan region of said pressure side of said first vane;
said film cooling holes are distributed over a midspan region of said suction side of said first vane with a larger CFD than a corresponding midspan region of said suction side of said second vane; and
said film cooling holes are further distributed over a root or tip region of said vanes with a larger CFD than said midspan regions thereof.

13. A nozzle according to claim 12 wherein said film cooling holes are distributed over both said root and tip regions of said suction side of said first vane and said pressure side of said second vane with larger CFD than over said midspan regions thereof.

14. A nozzle according to claim 12 wherein said film cooling holes are distributed over both said root and tip regions of said pressure side of said first vane and said suction side of said second vane with larger CFD than over said midspan regions thereof.

15. A nozzle according to claim 12 wherein said cooling flow density includes quantity of said film cooling holes per unit area, with more of said holes being used to increase cooling flow therethrough for effecting said larger CFD.

16. A nozzle according to claim 12 wherein:
said film cooling holes are angled aft in chord between said leading and trailing edges in said midspan regions of said vanes; and
said film cooling holes are angled radially in span in said root and tip regions of said vanes.

17. A nozzle according to claim 16 wherein said film cooling holes are angled up toward said outer band in said tip regions of said vanes, and angled down toward said inner band in said root regions.

18. A nozzle according to claim 12 wherein said first and second cooling circuits further comprise patterns of showerhead cooling holes along said leading edges of said first and second vanes angled up near said outer band and angled down near said inner band.

19. A nozzle according to claim 12 wherein said outer and inner bands include patterns of band holes having larger CFD along said outboard passages than along said inboard passage.

20. A nozzle according to claim 19 wherein said band holes are distributed along leading edges of said bands in larger quantity on said suction side of said first vane than said pressure side thereof, and larger in quantity on said pressure side of said second vane than said suction side thereof.

21. A gas turbine comprising:
a duplex turbine nozzle including a row of different first and second vanes alternating circumferentially between radially outer and inner bands in vane doublets having axial splitlines therebetween;
a row of turbine blades following said nozzle;
a duplex turbine shroud surrounding said blades, and including a row of different first and second shroud segments alternating circumferentially around said blades;
said first and second vanes having different patterns of film cooling holes with larger cooling flow density along outboard flow passages of said nozzle including said splitlines than along inboard flow passages of said nozzle excluding said splitlines; and
said first and second shroud segments have corresponding patterns of cooling holes with larger CFD along said first segments than along said second segments.

22. A turbine according to claim 21 wherein said first segments are clocked with said outboard passages, and said second segments are clocked with said inboard passages.

23. A turbine according to claim 22 in combination with an upstream annular combustor having a row of fuel injectors, and said outboard passages are clocked with said fuel injectors for receiving hot combustion streaks therefrom, and said inboard passages are clocked offset with said injectors for receiving cold combustion streaks from the spaces therebetween.

24. A turbine combination according to claim 23 wherein said cooling holes in said second segments have smaller flow diameters than said cooling holes in said first segments.

* * * * *